No. 727,504. PATENTED MAY 5, 1903.
E. WALKER.
ICE CREAM FREEZER.
APPLICATION FILED DEC. 6, 1902.
NO MODEL. 3 SHEETS—SHEET 1.
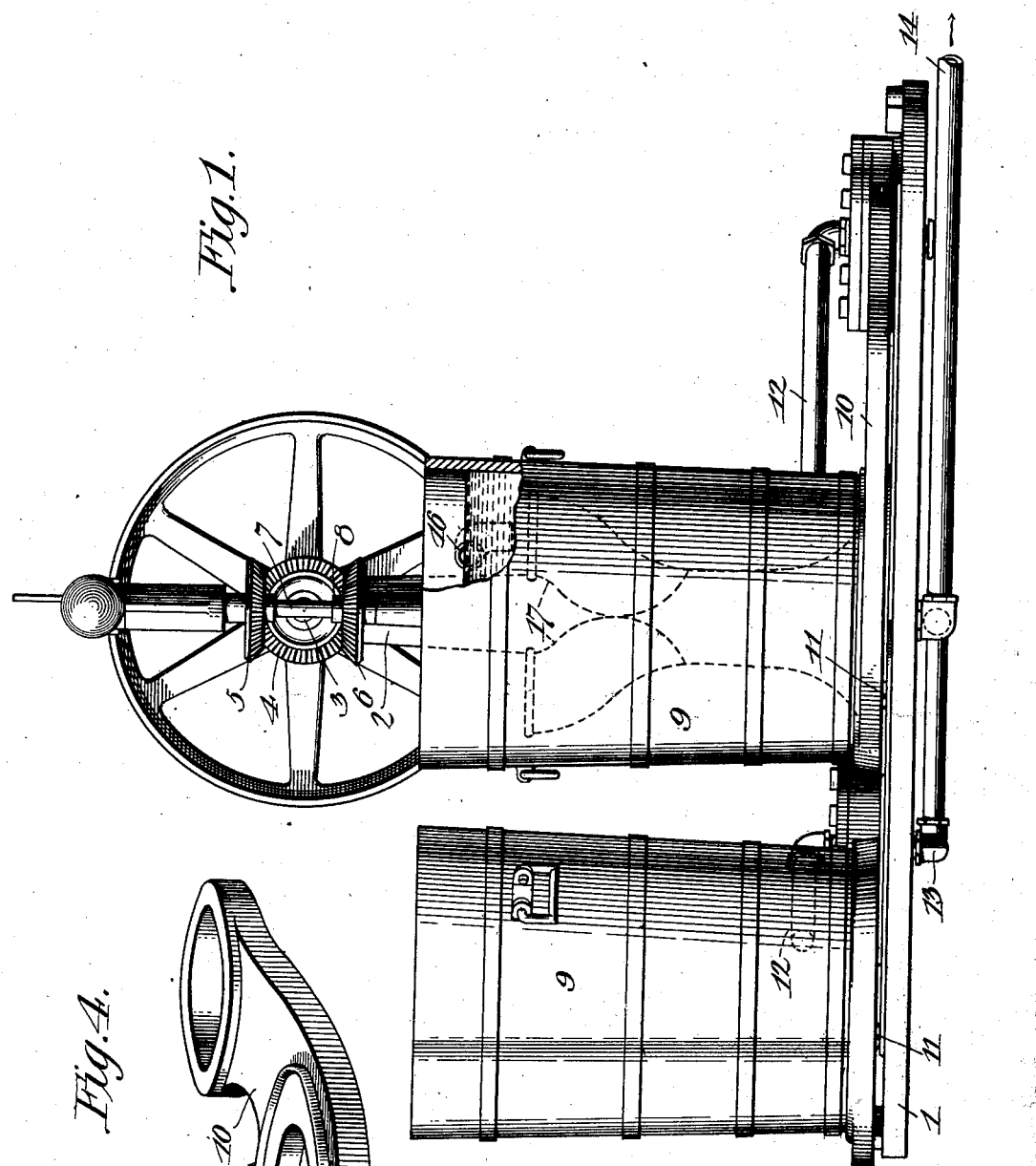
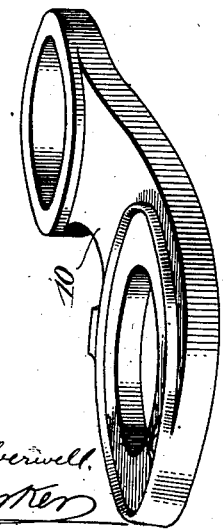
Edward Walker, Inventor;

No. 727,504. PATENTED MAY 5, 1903.
E. WALKER.
ICE CREAM FREEZER.
APPLICATION FILED DEC. 6, 1902.
NO MODEL. 3 SHEETS—SHEET 2.
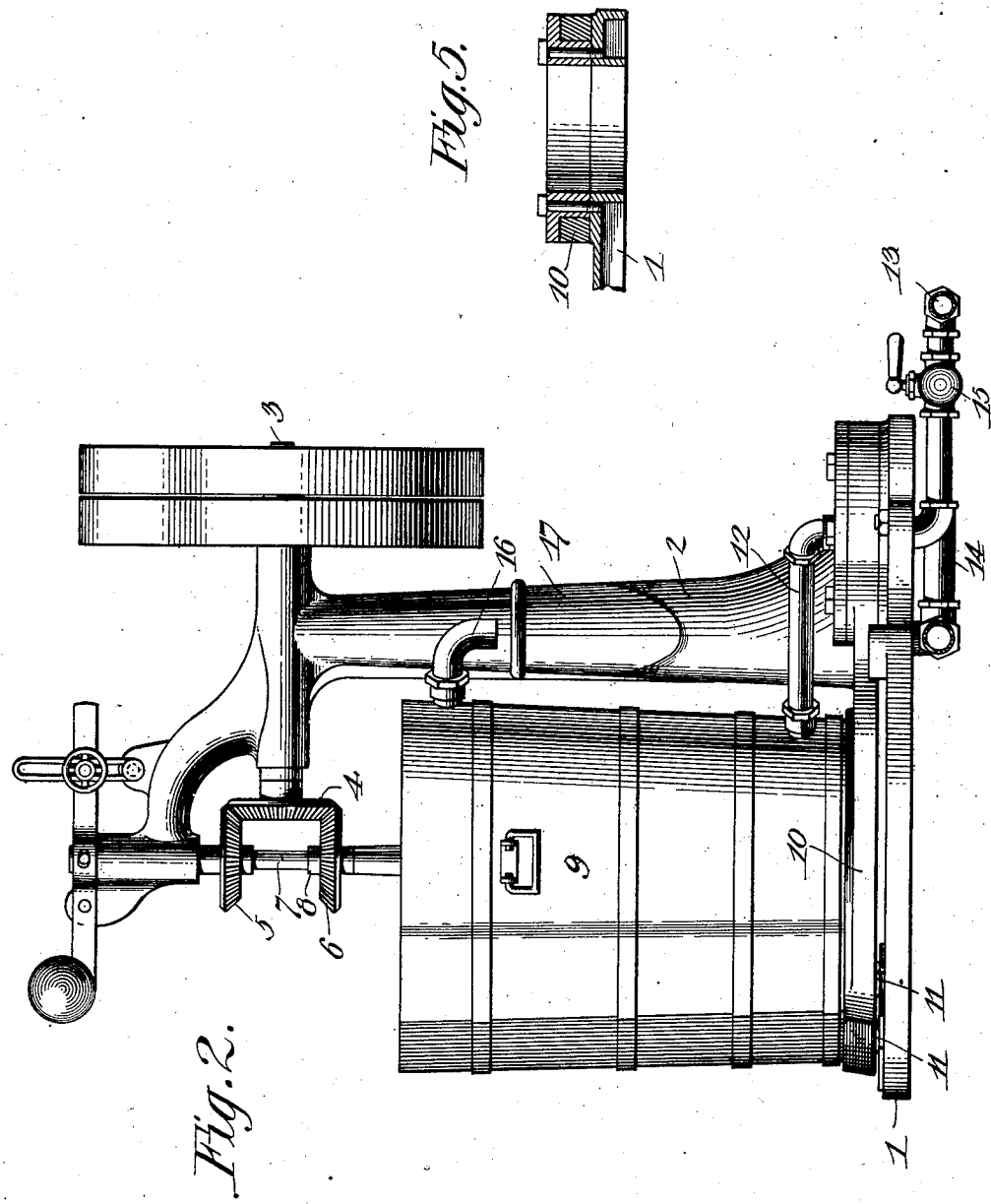
Witnesses
Edward Walker Inventor
by
Attorneys

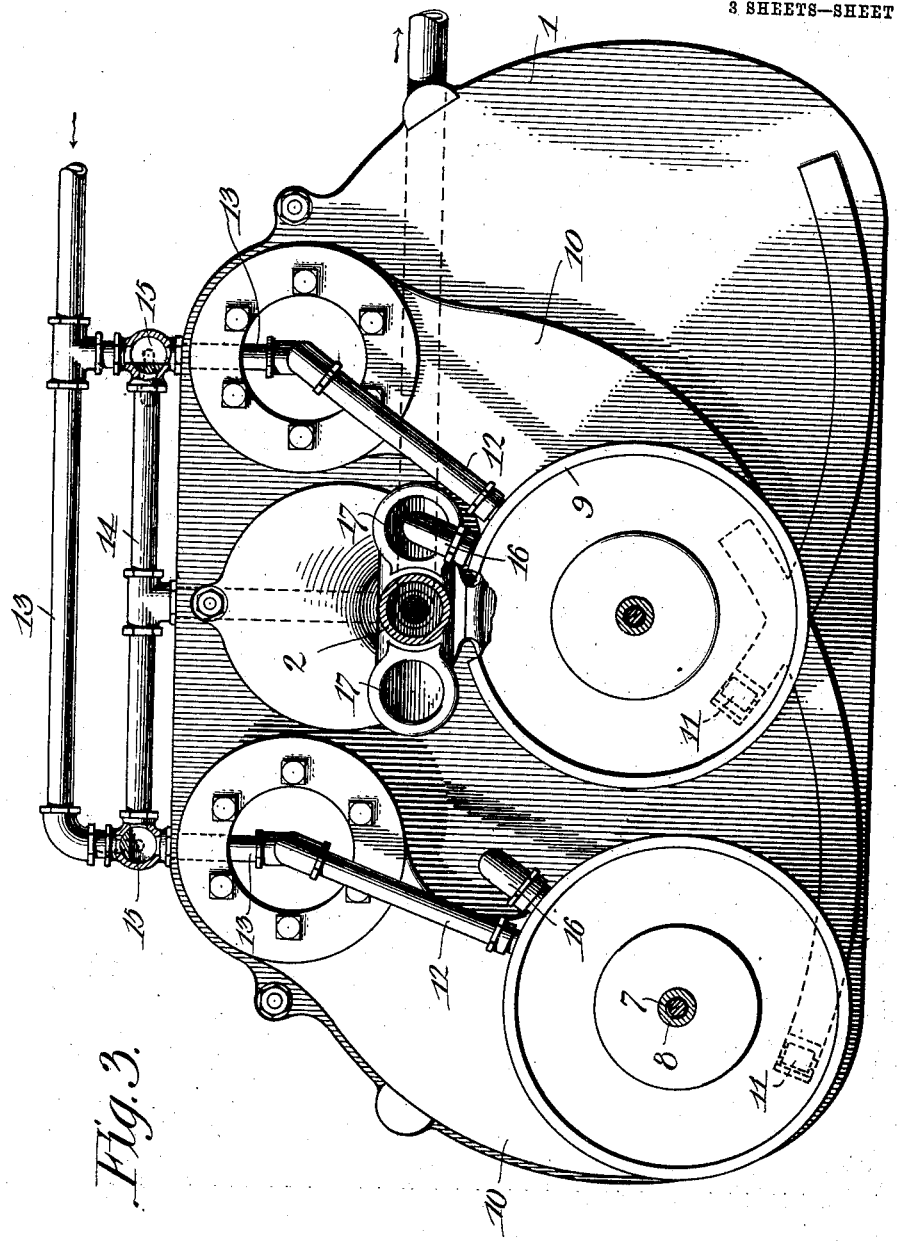

No. 727,504. Patented May 5, 1903.

UNITED STATES PATENT OFFICE.

EDWARD WALKER, OF WARREN, PENNSYLVANIA.

ICE-CREAM FREEZER.

SPECIFICATION forming part of Letters Patent No. 727,504, dated May 5, 1903.

Application filed December 6, 1902. Serial No. 134,182. (No model.)

*To all whom it may concern:*

Be it known that I, EDWARD WALKER, a citizen of the United States, residing at Warren, in the county of Warren and State of Pennsylvania, have invented a new and useful Ice-Cream Freezer, of which the following is a specification.

This invention has relation to ice-cream freezers adapted to freeze or manufacture ice-cream expeditiously and on a relatively large scale and which are generally operated by power, though it will appear that the improvements are not limited to any particular means of driving the machine.

It is the object of the invention to provide improvements in ice-cream freezers whereby the freezing operation may be materially expedited, a saving effected both in time and in the substances employed, greater ease attained in attending to the working of the machine, the ends of cleanliness and comfort enhanced, and other advantages secured that are of importance in the construction and operation of the machines mentioned.

A further object of the invention is to provide an improved freezer in which a constant circulation of brine may be maintained in the tubs during the operation of the machine and to so arrange the connections as to permit of the movement of the tub into and out of operative rotation with the dasher-actuating mechanism without interfering with the pipes or rendering it necessary to disconnect the same before moving the tubs.

A further object of the invention is to provide an ice-cream freezer with a duplicate tub-carrier or a plurality of carriers, so that while the cream contained in the can of one tub is being frozen another or other tubs and their equipments may be "connected up" ready for freezing or discharging, as the case may be.

The invention also consists of various improvements in ice-cream-freezing means, as will appear from the following description and from the drawings hereto appended and forming a part of this specification.

Of the said drawings, Figure 1 is a front elevation of an ice-cream freezer constructed in accordance with the invention. Fig. 2 is an end elevation of the same. Fig. 3 is a plan view of the machine, the operating mechanism being removed in order to more clearly illustrate the arrangement of the piping connections. Fig. 4 is a detail perspective view of one of the tub-supports detached. Fig. 5 is a transverse sectional elevation illustrating one of the tub-support connections with the frame.

In carrying out my invention I have contemplated using it in connection with a system of manufacturing ice-cream by the employment of brine direct from a refrigerating machine or cooler without the use of ice in the tubs. However, the invention may be used as well with salt and ice in the tubs, as is commonly understood. For the most part the description hereinafter given will be directed to the first-mentioned system.

In the drawings, 1 designates the base of the machine.

2 is a standard or upright, one of the functions of which is to support the operative parts of the machine which effect the stirring and agitation of the cream during the freezing operation.

3 is the main driving-shaft, provided with fast and loose pulleys, as shown, or other suitable means, which may be driven from any known prime operating means. The end of the shaft 3 opposite to that on which the pulleys are located is provided with a bevel-gear 4, which engages the gears 5 and 6, connected with the shaft 7 and sleeve-shaft 8, to rotate the dasher and can, respectively, in the usual well-known manner. These operative means are supported in the top of the standard.

9 designates the tub, which rests on the outer part of the tub-carrier 10, the latter consisting of an iron arm or frame working on a swing-joint on the base 1, as shown. The tub-carrier is provided on its bottom with a wheel or roller 11, running on a track on the base-plate to facilitate the swinging of the carrier to and fro.

12 designates the brine supply and drainage pipe, connected at one end with the tub at its lower part and having at the other end a swing-joint or swivel connection with the main supply-pipe 13, which may be connected to a tank or other source of supply, and each tub-pipe is also connected to a drain-pipe 14, leading back to the circulating tank or pump.

At the juncture of each tub-pipe with the supply and drain pipes is placed a three-way cock 15, which may be turned to place the tub-pipes in communication with either the supply or drain pipe and to control the flow of brine from the cooler or ice-tank (not shown) to the tub. If the tub-pipe were made flexible and of sufficient length, its connections, it is obvious, might be made rigid.

At a point suitably near the top of the tub there is an outlet from which the brine as the tub fills flows out through a spout 16, that is directly over the opening 17, leading into the hollow standard 2, the latter forming a receiver, and the brine collected in said receiver may flow through the drain-pipe 14 back into the cooler-tank to be rinsed, or if salt and ice is used in the freezing process it may be piped to a sewer or other drainage. Thus in the first instance securing great economy and in the latter, as well as the former, avoiding wet floors.

When the machine is provided with two connected carriers, each bearing a tub, while freezing is being carried on in the can of one tub the other tub and its equipments can be put in readiness, so that when the first is finished and its controlling-valve 15 turned to place the tub-pipe in communication with the drainage-pipe the valve in the supply-pipe of the other may be opened and the arms swung around so as to bring the latter tub into position to have the means for operating the can and dasher connected therewith. This last-mentioned means may be of common and well-known construction, as shown.

By this invention it will be seen that the tubs are continuously connected with the brine-supply main no matter what the position of the tubs may be, thereby avoiding the connecting or disconnecting of hose or other brine-conveying devices. Again, as the carriers are easily swung about from one position to another and as one can may be "dished" while the other is freezing the work can not only be done expeditiously, but a boy of relatively little strength can do the work, thus dispensing with the labor of strong men now commonly employed in ice-cream-making establishments and the great expense consequent thereon and this, in addition to the saving in time, by keeping the machine in constant operation. Moreover, by avoiding wet floors and the constant circulation of the brine there is a great saving of time and also of expense in cooling the same, since the brine pumped back into the cooler though having done its work in the tub will be at a relatively low temperature.

As hereinbefore explained, when the brine system is not used and ice and salt are employed for freezing, as in the old and common way, my improved machine may be operated with great advantages, and the receiver and brine pipes may be used to conduct and carry away the salt water that now commonly flows over the floor to the discomfort of the attendants and hindrance in their work, not to again speak of the great waste of the freezing substance.

Having thus set forth the construction and mode of operation of the invention, though without attempting to describe all the forms in which it may be made or all manners in which it may be used, what is claimed is—

1. The combination in an ice-cream freezer, of a frame, dasher-operating mechanism, and a plurality of independent swinging tub-carriers mounted on the frame at either side of said mechanism and adjustable so that one or other may occupy an operative position under said freezing mechanism.

2. The combination in an ice-cream freezer, of the frame, dasher-operating mechanism, a tub, a swinging tub-carrier movable to operative and inoperative positions with respect to said mechanism, a brine-supply means, a pipe connecting the brine-supply and tub and movable with said tub, and a brine-discharge spout carried by and communicating with the upper portion of the tub.

3. An ice-cream freezer comprising in combination, a frame, dasher-operating mechanism, a tub, a swinging tub-carrier movable to operative and inoperative positions with respect to said mechanism, a brine-supply means, a pipe connecting the tub with the brine-supply means and movable with said tub, a brine-receiver arranged adjacent to the dasher-operating mechanism, and a brine-discharge spout carried by the tub and movable to a position over the brine-receiver when the tub is adjusted to operative position.

4. The combination in an ice-cream freezer, of a frame, a swinging tub-carrier, a brine-receiver, a discharge-spout carried by the tub and movable to a position over the brine-receiver, means connected with the latter for carrying away the brine, and means for supplying brine to the tub.

5. An ice-cream freezer comprising in its construction a frame, a dasher-operating mechanism, and a pair of independently-pivoted tub-carrying arms having their pivots disposed respectively on opposite sides of the dasher-operating mechanism and movable into and out of operative relation with said dasher-operating mechanism.

6. An ice-cream freezer comprising in its construction a frame, a dasher-operating mechanism, a plurality of tub-carrying arms, each having a swing-joint connection with the frame, tubs on the carrying-arms, a brine-supply means, a pipe connecting each tub with the brine-supply and having a swing-joint connection with the latter, and a brine-receiver disposed adjacent to the dasher-operating mechanism, and adapted to receive the brine from the upper portion of the tubs.

7. An ice-cream freezer comprising in its construction a frame, a dasher-operating mechanism, two connected tub-carrying arms having a swing-joint connection with the frame, tubs on the carrying-arms, a brine-supply means, a pipe connecting each tub with the brine-supply and having a swing-joint connection with the latter, and a valve in each of the said pipes.

8. The combination in an ice-cream freezer, of a hollow standard, dasher-operating mechanism supported thereby, a pair of pivotally-mounted tub-carrying arms movable into and out of operable relation with said mechanism, the tubs, brine supply and discharge pipes connected to the tubs and overflow-spouts leading from the tubs and discharging into the hollow standard.

9. The combination in an ice-cream freezer, of a hollow standard, a dasher-operating mechanism carried thereby, a pair of pivotally-mounted tub-carrying arms movable into and out of operable relation with said mechanism, supporting-rollers for said arms, the tubs, a combined supply and drainage pipe connected to each of the tubs and swiveled at the axis of movement of the arms, a supply and a discharge pipe connected to each of the tub-pipes, a three-way cock for controlling the direction of flow of the brine, overflow-spouts carried by the tubs and discharging into the hollow standard, and a drain-pipe leading from said hollow standard.

In testimony that I claim the foregoing as my own I have hereto affixed my signature in the presence of two witnesses.

EDWARD WALKER.

Witnesses:
  FRED N. COOK,
  CLYDE W. JURY.